(12) United States Patent
Henkel et al.

(10) Patent No.: US 7,125,339 B2
(45) Date of Patent: Oct. 24, 2006

(54) TRIPOD JOINT

(75) Inventors: Juergen Henkel, Kernen (DE); Peter Muenich, Fellbach (DE); Rolf Schroeder, Stuttgart (DE); Guenter Woerner, Kernen (DE)

(73) Assignee: DaimlerChrysler AG, Stuttgart (DE)

( * ) Notice: Subject to any disclaimer, the term of this patent is extended or adjusted under 35 U.S.C. 154(b) by 241 days.

(21) Appl. No.: 10/227,034

(22) Filed: Aug. 23, 2002

(65) Prior Publication Data

US 2003/0054891 A1 Mar. 20, 2003

(30) Foreign Application Priority Data

Aug. 23, 2001 (DE) ................. 101 41 427

(51) Int. Cl.
*F16D 3/205* (2006.01)
(52) U.S. Cl. ............... 464/111; 464/132; 403/126
(58) Field of Classification Search ............ 464/111, 464/122, 123, 124, 132, 905; 403/122, 126, 403/135
See application file for complete search history.

(56) References Cited

U.S. PATENT DOCUMENTS

| | | | |
|---|---|---|---|
| 2,670,975 A * | 3/1954 | Schwabe ................. 403/122 X |
| 2,987,351 A | 6/1961 | Aberle |
| 4,568,216 A * | 2/1986 | Mizusawa et al. ....... 403/112 X |
| 4,619,628 A | 10/1986 | Orain |
| 4,828,534 A | 5/1989 | Orain |
| 5,019,016 A | 5/1991 | Uchman |
| 5,160,297 A | 11/1992 | Uchman |
| 5,167,583 A * | 12/1992 | Bensinger et al. .......... 464/111 |
| 5,184,978 A | 2/1993 | Fillmore et al. |
| 5,199,925 A | 4/1993 | Welschof |
| 5,256,107 A | 10/1993 | Matsumoto et al. |
| 5,391,013 A | 2/1995 | Ricks et al. |
| 5,564,853 A * | 10/1996 | Maughan ................. 403/135 X |
| 5,782,574 A * | 7/1998 | Henkel ........................ 403/135 |
| 6,264,565 B1 | 7/2001 | Sugiyama et al. |
| 6,302,615 B1 * | 10/2001 | Kleiner et al. .............. 403/135 |
| 6,682,433 B1 | 1/2004 | Henkel et al. |
| 2002/0055389 A1 | 5/2002 | Mizukoshi et al. |
| 2003/0040365 A1 * | 2/2003 | Henkel et al. .............. 464/111 |
| 2003/0040366 A1 * | 2/2003 | Henkel et al. .............. 464/111 |
| 2003/0040367 A1 * | 2/2003 | Henkel et al. .............. 464/111 |

FOREIGN PATENT DOCUMENTS

| | | |
|---|---|---|
| DE | 1 575 585 | 2/1970 |
| DE | 28 31 044 | 10/1979 |
| DE | 38 16 646 | 12/1988 |
| DE | 39 36 602 | 5/1991 |
| DE | 43 00 793 | 7/1993 |
| DE | 43 27 036 | 2/1995 |
| DE | 43 27 606 | 2/1995 |
| DE | 196 10 916 | 9/1997 |

(Continued)

OTHER PUBLICATIONS

Henkel et al., U.S. Appl. No. 2001/0044341, published Nov. 22, 2001.

*Primary Examiner*—Greg Binda
(74) *Attorney, Agent, or Firm*—Kenyon & Kenyon LLP

(57) ABSTRACT

A ball body is guided in a partially cylindrical hole into which a guide ring is inserted to secure it axially and to guide the pivoting movement. The tripod joint is suitable for the displaceable and pivotable driving connection of two shaft ends, in particular in conjunction with drive trains or side shafts of motor vehicles.

5 Claims, 3 Drawing Sheets

FOREIGN PATENT DOCUMENTS

| | | |
|---|---|---|
| DE | 100 16 677 | 10/2001 |
| EP | 0 426 186 | 4/1994 |
| FR | 2 738 881 | 3/1997 |
| GB | 1 264 447 | 2/1972 |
| WO | WO 99/45287 | 9/1999 |

* cited by examiner

TRIPOD JOINT

CROSS-REFERENCE TO RELATED APPLICATIONS

The present application claims foreign priority to Application No. 101 41 427.7, filed on Aug. 23, 2001 in the Federal Republic of Germany, which is expressly incorporated herein in its entirety by reference thereto.

FIELD OF THE INVENTION

The present invention relates to a tripod joint.

BACKGROUND INFORMATION

Tripod joints are used, for example, as side shafts of motor vehicles. The tripod joints are used for transmitting driving torques between two driving elements of a drive train. The tripod joints allow a relative displacement and a relative pivoting of the driving elements to be compensated for. In the case of side shafts of a motor vehicle, relative movements of this type are caused by spring deflections of the vehicle wheels.

U.S. Pat. No. 4,619,628 describes a tripod joint having a joint outer part and a joint inner part held in the latter. The joint inner part has a tripod star having ball bodies having pins. The ball bodies are accommodated pivotably in a partially spherical universal ball joint of a pressure element and are therefore mounted pivotably with respect to the pressure element. The pressure element is mounted movably via rolling bearings with respect to the mating surfaces of the joint outer part.

The production of the recess in the pressure element for the purpose of forming the universal ball joint requires a high manufacturing outlay. In order to realize extensive bearing surfaces of the pressure element on the ball body, a curved surface is required to be manufactured with great precision. The installation of the ball body in the pressure element constitutes a further problem. Conventionally, a configuration of the connection as a bayonet connection is required for this purpose.

SUMMARY

It is an object of the present invention to provide a different connection configuration, which may ensure pivoting, between the pressure element and ball body of a tripod joint.

The above and other beneficial objects of the present invention are achieved by providing a tripod joint as described herein.

The recess in the pressure body is configured with a cylindrical subregion. The latter may be manufactured with great precision in a simplified manner in comparison to a spherical surface. At least one guide ring is inserted into the pressure body in the region of the cylindrical subregion. This enables the installation options to be expanded. Furthermore, the guide ring may be manufactured from a different material than the pressure body. For example, a, e.g., more expensive, material having improved sliding properties may be used in the region of the at least one guide ring. The ball body is supported with respect to the pressure body via the guide ring. When the guide ring is removed, removal of the pressure element from the ball body may take place, for example. Complex bayonet connections are therefore rendered superfluous. The installation of the pressure body together with the ball body does not require any rotating movement as in the case of a bayonet connection. Furthermore, defined contact regions—in contrast to extensive bearing surfaces—for the transmission of force between the ball body and pressure body may be predetermined by the guide rings.

In one example embodiment of the present invention, the recess is configured as a cylindrical hole into which two spaced apart guide rings are inserted. In order to manufacture this example embodiment, the hole and the grooves have merely to be made in the pressure element. The guide rings may be produced in large piece numbers.

DETAILED DESCRIPTION

Figure 1:
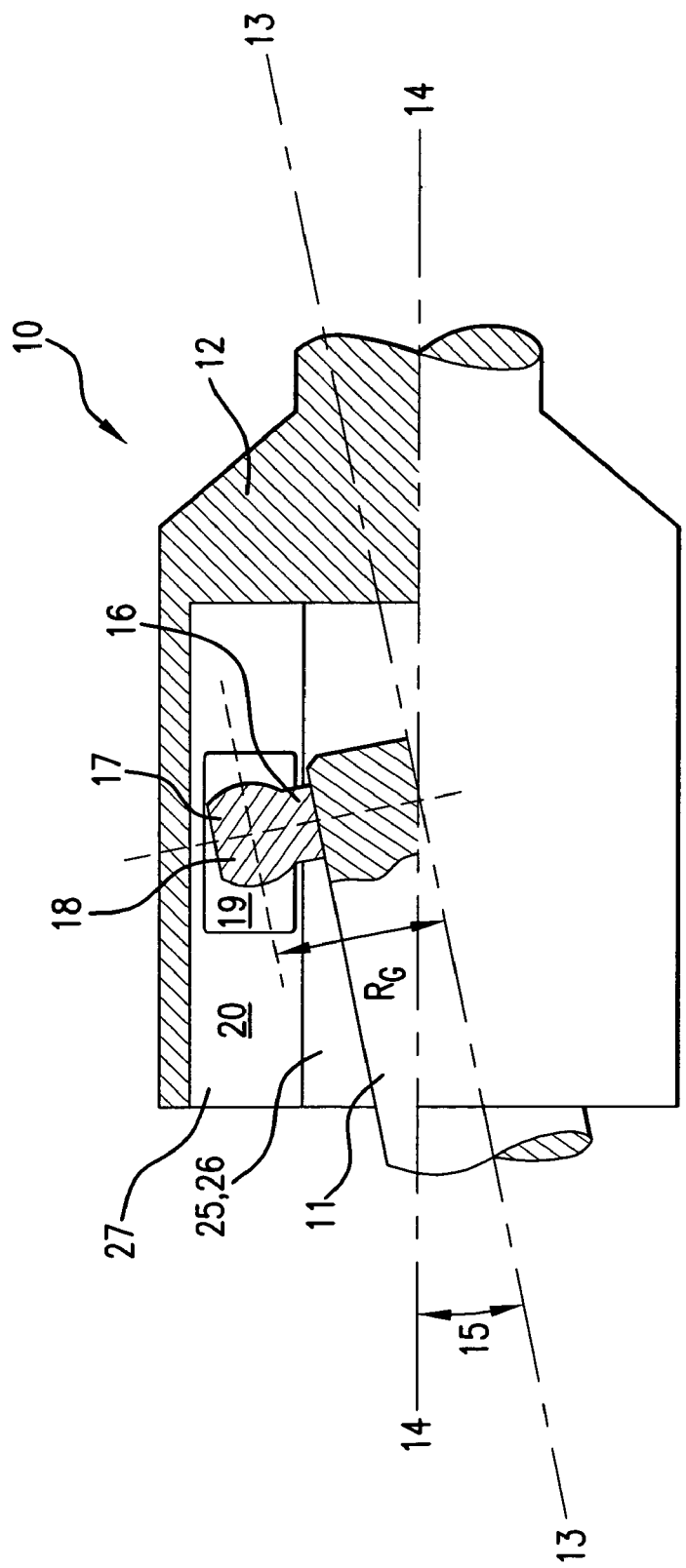
FIG. 1 is a longitudinal cross-sectional view of a tripod joint.

A tripod joint 10 has a joint inner part 11 and a joint outer part 12 holding the latter. The joint inner part 11 and the joint outer part 12 are in each case connected, at least in a rotationally fixed manner, to a driving element of a drive train of a motor vehicle, for example to a drive shaft and a vehicle wheel. The tripod joint 10 is used to transmit a driving torque between the joint inner part 11 and the joint outer part 12 while ensuring a relative displacement along the longitudinal axis 13—13 of the joint inner part 11 and along the longitudinal axis 14—14 of the joint outer part 12, a relative pivoting of the joint inner part 11 with respect to the joint outer part 12, which pivoting is associated with a change in the angle 15 between the longitudinal axes 13—13 and 14—14, and a three-dimensional movement which arises from a combination of the abovementioned forms of movement.

The joint inner part 11 has, at the end on the inside, three pins 16 which are formed as a single piece or a number of pieces together with the latter, are orientated radially and are distributed in each case at 120° in the circumferential direction and form a tripod star. The pins 16 have in each case a partially spherical ball body 17. In order to transmit forces in both circumferential directions, the ball body 17 bears, in each case in the region of the spherical lateral surface, against a correspondingly configured recess 18 of a pressure element 19. On the opposite side of the pressure element 19, which side faces a flat mating surface 20 of the joint outer part 12, the pressure element is of flat configuration with a running surface 21.

The running surface 21 and the mating surface 20 are orientated parallel to each other. Cylindrical rolling bodies 23, in particular rollers or needles, are held between the latter forming a linear contact. A plurality of rolling bodies are guided in a cage 24 in such a manner that the relative position of the longitudinal axes of the rolling bodies with respect to the cages does not change substantially. In order to transmit circumferential forces in the opposite direction, each pin 16 is configured with two associated pressure elements 19, the rolling bodies 23 and the surfaces 20, 21 symmetrically to a pin central plane accommodating the longitudinal axis 13—13.

The running surface 21 of a pressure element 19 may have a rectangular form, with the result that as many rolling bodies 23 as possible form a load-bearing contact with the surface pressure being reduced. However, circular or oval pressure elements 19 are also possible.

The joint outer part 12 has a recess 25 orientated in the direction of the longitudinal axis 14—14 with an essentially circular, central hole 26 and three holding spaces 27 which are orientated radially and are distributed in each case at 120° C. in the circumferential direction and are used in each case for holding and supporting a pin 16, two pressure elements 19 and rolling bodies 23. In the section illustrated in FIG. 2, the holding spaces 27 have an essentially U-shaped contour open in the direction of the hole 26, the side limbs of the U-shaped contour being formed with the mating surfaces 20. In the exemplary embodiment illustrated in FIG. 2, the side limbs are of rectilinear configuration without a transitional region to the mating surfaces 20. In the direction of the hole 26, the side limbs do not, in particular, have any projections or depressions, but rather merge into the hole 26 in the end region on the inside with an enlargement of the spacing. In the position of the tripod joint illustrated in FIG. 2, the rolling bodies together with the cage are arranged spaced apart radially from the main limb of the U-shaped contour.

Figure 2:
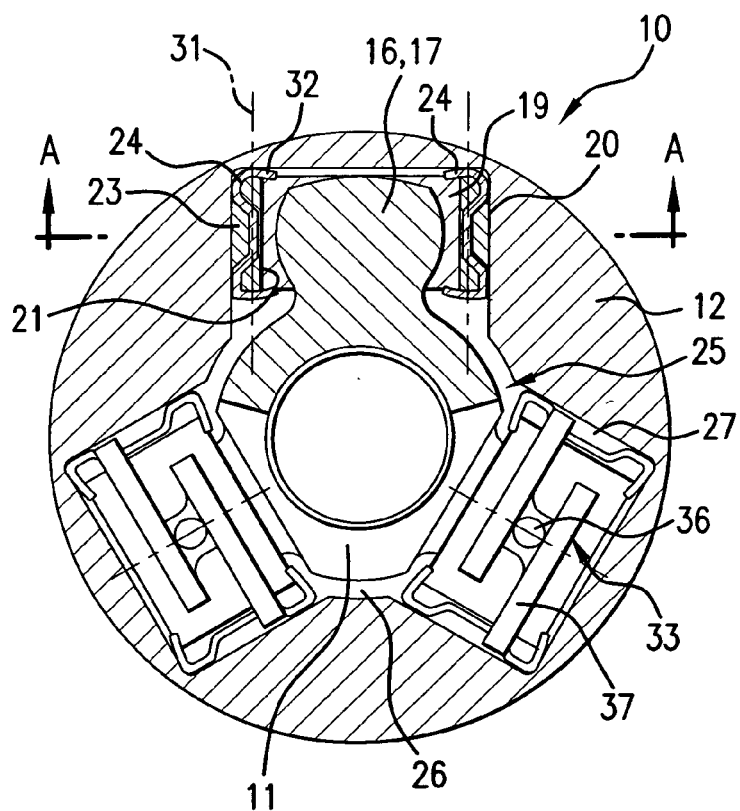
FIG. 2 is a cross-sectional view of a tripod joint.
Figure 4:
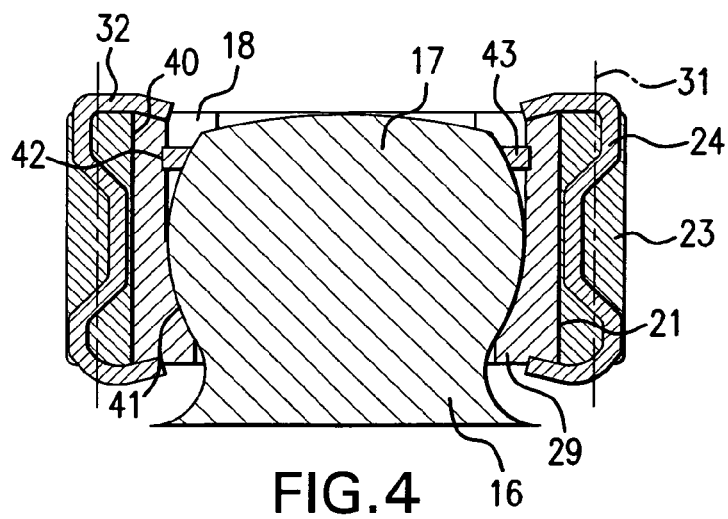
FIG. 4 is a cross-sectional view of a joint pin according to the present invention with pressure element, guide ring, moving cage and rolling bodies taken transversely with respect to longitudinal axis 13—13.
Figure 5:
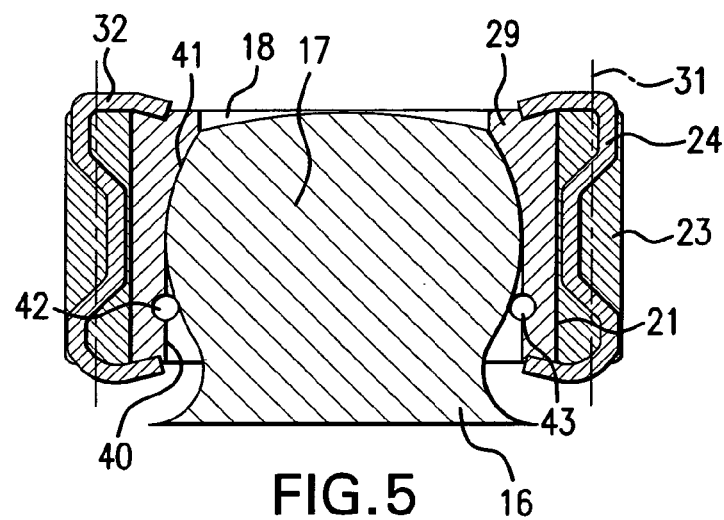
FIG. 5 is a cross-sectional view of a further joint pin according to the present invention with pressure element, guide ring, moving cage and rolling bodies taken transversely with respect to longitudinal axis 13—13.
Figure 6:
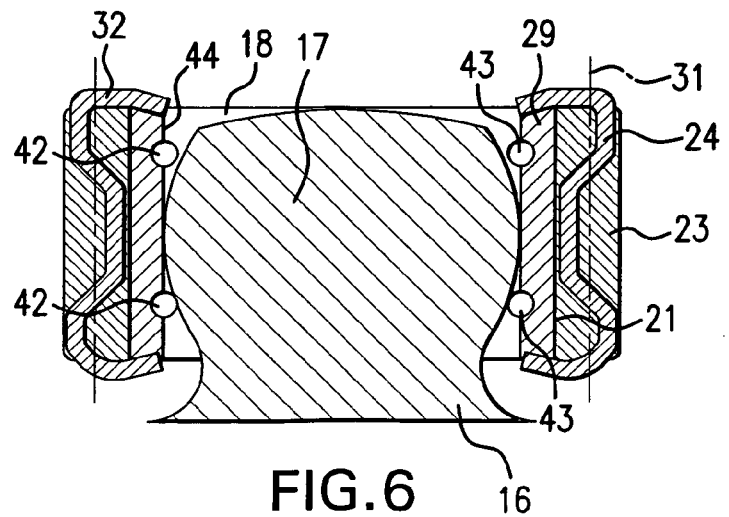
FIG. 6 is a cross-sectional view of a further joint pin according to the present invention with pressure element, guide ring, moving cage and rolling bodies taken transversely with respect to longitudinal axis 13—13.

As illustrated in FIG. 2, the rolling bodies 23 are guided in a cage 24. The rolling bodies 23 are guided in the cages 24 with the relative position of the longitudinal axes 31 of the rolling bodies 23 with respect to each other being ensured. The cages 24 are guided in the radial direction with respect to the pressure element 19 over shoulders 32 engaging around and enclosing the pressure element 19 (FIGS. 4 to 6). The cages 24 may be "clipped" via the shoulders 32 onto the pressure element 19, as illustrated. The cages 24 may furthermore be centered in the running direction of the rolling bodies 23 via centering or spring elements 33. Two cages 24 of a pin 16 may be guided and centered via a common spring element 33.

For both circumferential directions, the pressure elements 19 assigned to a ball body 17 are connected via two connecting webs 34 to form a pressure body 29 configured as a single piece. According to the example embodiment illustrated in FIG. 3, an introduction of the ball body 17 into the single-piece pressure body 29 may be ensured by a configuration.

Figure 3:
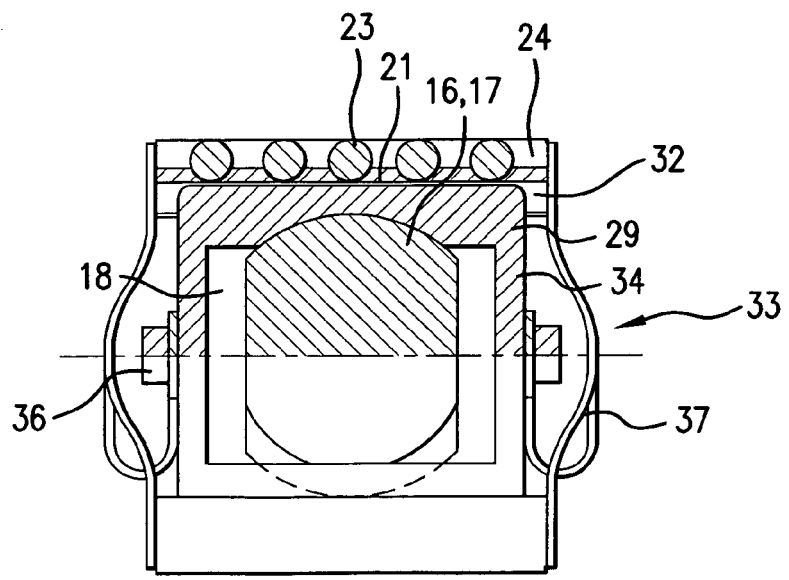
FIG. 3 is a cross-sectional view of a joint pin with pressure body, cage, rolling bodies and centering elements taken along the line A—A illustrated in FIG. 2.

According to the exemplary embodiment illustrated in FIGS. 2 and 3, two spring elements 33 are connected to the pressure body 29 or the ball body 17 via a respective fastening arrangement 36. The spring elements 33 in each case have two elastic fingers 37 which bear against the opposite cages 24 or are connected thereto, for the purpose of supporting them.

In comparison with the ball body 17, the cage 24 having the rolling bodies has, in particular, just two degrees of freedom: a suitably selected connection of the ball body 17 to the pressure body 29 may ensure pivotability about an axis perpendicular with respect to the plane defined by the longitudinal axis 13—13 of the joint inner part 11 and the longitudinal axis of the pins 16. The second degree of freedom is the connection between the cage 24 and pressure body 29, which connection may be displaced in a translatory manner. In order to ensure the pivotability of the pressure body 29 with respect to the ball body 17, as illustrated in FIG. 3 the pressure element 29 may hold the ball body 17 in a universal ball joint.

In a departure from the previously illustrated form of holding in a universal ball joint, according to the present invention, holding occurs as illustrated in FIGS. 4 to 6.

According to the exemplary embodiment illustrated in FIG. 4, the recess 18 in the pressure body 29 has a first, cylindrical subregion 40 and a subregion 41 which is adjacent to the latter and corresponds essentially to a subsurface of a hemisphere. In the region of the subregion 41, the latter bears extensively against the ball body 17. Spaced apart from the transitional region from the cylindrical subregion 40 to subregion 41, the cylindrical subregion has a groove 42 into which a guide ring 43 is inserted, in particular with radial expansion. Radially on the inside, the guide ring 43 bears against the ball body 17.

As illustrated in FIG. 4, the subregion 41 is arranged between the cylindrical subregion 40 and the central point of the tripod star while, as illustrated in FIG. 5, the cylindrical subregion 40 is arranged between the subregion 41 and the central point of the tripod star.

An example embodiment of the present invention which may be simple to produce is illustrated in FIG. 6: the recess 18 is, e.g., completely, configured cylindrically in the form of a hole 44 and has two spaced apart grooves 42 with guide rings 43. In this case, in the center of the two grooves 42 the ball body 17 bears against the hole 44 and against contact surfaces of the guide rings 43 radially on the inside. In the case of guide rings 43 having a different radial extent, the contact region of the ball body 17 may be displaced with the hole 44 out of the center in the direction of the guide ring 43 having a smaller radial extent. It is possible for the ball body 17 to bear only against the two guide rings 43 or against a third guide ring in the center.

The guide rings 43 may be manufactured from a material having good sliding properties, for example brass. The guide rings 43 have, in particular, a rectangular, circular or oval cross-section or, in the region facing the ball body 17, have a cross-sectionally concave curvature, in particular with the radius of the ball body 17. At least one guide ring 43 may be connected fixedly to the pressure body 29. For example, a guide ring 43 as illustrated in FIG. 6 is manufactured as an inner step of the recess 18 of the pressure body 19 or is connected to the latter with a cohesive material joint. Other forms of connecting the guide rings 43 to the pressure body 29, in particular form-fitting or frictional forms or forms with a cohesive material joint are possible. For example, at least one guide ring 43 may have an outer thread by which the guide ring 43 may be screwed into the pressure body.

Instead of the single-piece pressure body 29 illustrated in FIGS. 4 to 6, the latter may be formed in a number of pieces, in particular with two separate pressure elements 19.

The configuration according to the present invention may be suitable for any arrangement of a tripod joint, in particular those based on a ball body 17 guided in a universal ball joint.

The example embodiments described involve configurations only given by way of example. A combination of the described features for different example embodiments is possible. Further features, in particular features which have not been described, of the device parts belonging to the invention are to be taken from the device-part geometries illustrated in the drawings.

What is claimed is:

1. A tripod joint for transmitting a driving torque between two driving elements of a drive train, comprising:
    a joint inner part; and
    a joint outer part holding the joint inner part, the joint inner part having a tripod star including ball bodies with pins, the ball bodies in each case mounted in a recess in a pressure body pivotable with respect to the pressure body, the pressure body and a rolling body configured to transmit the driving torque to the joint outer part, the recess in the pressure body including a cylindrical subregion, at least one guide ring inserted into the pressure body in a region of the cylindrical subregion, at least one of the ball bodies supported with respect to the pressure body via the guide ring;
    wherein the pressure body includes a spherical subregion configured to support the ball body in at least one radial direction.

2. The tripod joint according to claim 1, wherein the recess includes a cylindrical hole in which a guide ring is inserted in an area of the cylindrical subregion of the pressure body.

3. A tripod joint, for transmitting a driving torque between two driving elements of a drive train, comprising:
    a joint inner part; and
    a joint outer part holding the joint inner part, the joint inner part having a tripod star including ball bodies with pins, the ball bodies in each case mounted in a recess in a pressure body pivotable with respect to the pressure body, the pressure body and a rolling body configured to transmit the driving torque to the joint outer part, the recess in the pressure body including a cylindrical subregion, at least one guide ring inserted into the pressure body in a region of the cylindrical subregion, at least one of the ball bodies supported with respect to the pressure body via the guide ring;
    wherein the guide rings include a concave curved and smooth cross-section at least in a region facing the ball body.

4. A tripod joint for transmitting a driving torque between two driving elements of a drive train, comprising:
    a joint inner part;
    a joint outer part holding the joint inner part, the joint inner part having a tripod star including ball bodies with pins, the ball bodies in each case mounted in a recess in a pressure body pivotable with respect to the pressure body, the pressure body and a rolling body configured to transmit the driving torque to the joint outer part, the recess in the pressure body including a cylindrical subregion, at least one guide ring inserted into the pressure body in a region of the cylindrical subregion, at least one of the ball bodies supported with respect to the pressure body via the at least one guide ring;
    a cage configured to contain and guide the rolling body, the rolling body including a plurality of cylindrical elements; and
    shoulders configured to couple the cage to the pressure body;
    wherein the cage is adapted to move in a radial direction with respect to the pressure body guided by the shoulders; and
    wherein the pressure body includes a spherical subregion configured to support the ball body in at least one radial direction.

5. The tripod joint according to claim 4, wherein, within the cage, a relative position of longitudinal axes of the plurality of cylindrical elements with respect to each other is maintained.

* * * * *